United States Patent [19]

Meads

[11] Patent Number: 5,272,747
[45] Date of Patent: Dec. 21, 1993

[54] MOBILE PAY TELEPHONE SYSTEM

[75] Inventor: Stephen B. Meads, Watsons Bay, Australia

[73] Assignee: Australian and Overseas Telecommunications Corp. Limited, Parramatta, Australia

[21] Appl. No.: 663,902
[22] PCT Filed: Sep. 8, 1989
[86] PCT No.: PCT/AU89/00382
  § 371 Date: May 8, 1991
  § 102(e) Date: May 8, 1991
[87] PCT Pub. No.: WO90/03077
  PCT Pub. Date: Mar. 22, 1990

[30] Foreign Application Priority Data

Sep. 9, 1988 [AU] Australia .................. PJ0336

[51] Int. Cl.⁵ .................. H04M 11/00; H04M 17/00
[52] U.S. Cl. .................. 379/59; 379/144; 379/145; 379/147; 379/150; 379/155; 194/344; 194/346
[58] Field of Search .................. 379/58, 59, 63, 143, 379/144, 145, 147, 148, 150, 155, 93; 194/344, 346, 350, 351

[56] References Cited

U.S. PATENT DOCUMENTS

| | | | |
|---|---|---|---|
| 1,470,747 | 12/1919 | Juley | 379/150 |
| 2,278,436 | 4/1942 | Friend | 379/145 |
| 3,576,402 | 4/1971 | Baker et al. | 379/63 |
| 4,718,080 | 1/1988 | Serrano et al. | 379/63 |
| 4,737,976 | 4/1988 | Borth et al. | 379/63 |
| 4,860,341 | 8/1989 | D'Avello et al. | 379/144 |

FOREIGN PATENT DOCUMENTS

| | | | |
|---|---|---|---|
| 0574673 | 3/1958 | Italy | 379/150 |
| 0160149 | 12/1981 | Japan | 379/143 |
| 0106944 | 6/1983 | Japan | 379/143 |
| 0787676 | 12/1957 | United Kingdom | 379/150 |

OTHER PUBLICATIONS

"Hello Direct" catalog advertisement for Hi-res, hi-speed FAX machine lets you send or receive no matter where you are!, by GoFAX, May 1988.
"AB3X Cellular Interface Owner's Manual", by Morrison & Dempsey Communications, Nov. 16, 1987.
Telecommunication Journal of Australia article, vol. 30, No. 1, "The Improved Multi Purpose Coin Telephone: CT3(1)", 1980.
Personal Communications Technology article, "AB1X: Landline Emulator for Cellular", by Crump Jr., pp. 39 & 42, Jun. 1987.

Primary Examiner—Jin F. Ng
Assistant Examiner—Dwayne D. Bost
Attorney, Agent, or Firm—Richard C. Litman

[57] ABSTRACT

A mobile telephone system for public transportation vehicle, such as trains, cabs, etc., provides passengers with a wide variety of public services presently not available in any other system. Such services include access to facsimile machines and other peripheral devices, a range of payment options such as credit card or cash, and voice synthesized as well as visual instructions on how to operate the system making the system user friendly to an unrehearsed user.

28 Claims, 7 Drawing Sheets

MOBILE PAY TELEPHONE SYSTEM

BACKGROUND OF THE INVENTION

1. Field of the Invention

The present invention relates to a mobile telephone system and more particularly relates to a phone system including means for regulating access to said telephone system utilising a coin acceptor module means to enable interphasing of accessories onto the phone set and means to enable removal of coinage from the set.

2. Description of the Prior Art

There are in existence many types of access control phone systems commonly termed pay phones. These are generally in use as public phones and utilise a direct electric line for signal transfer when in operation. Other known access control devices in direct line phones comprise key lock systems which block the signal transfer when in the locked position. The direct line phone systems have been in use for a considerable time with the major most recent advance and departure from these conventional phones being the radio phone.

The introduction of the radio phone enables the installation of mobile phones in vehicles and the production of household mobile phones which are transportable and used within a given distance range. Whilst these phones have been applied for business, domestic and vehicle use, it is less common for a mobile phone system which has an access control system to be utilised in vehicles and adapted thereto to enable public use of such phones.

There are nevertheless, in existence, mobile cellular phones having a standard subscriber station which comprises a customer administrative input and display apparatus, a data modem, a local administrative processor for controlling the station either for or in support of credit card billing and for conducting two way high speed data communication with the central administrative processor and which can be reached by a direct dial telephone call. One such system is disclosed in Australian Patent Application No. 79214/89 by ARLENE J. HARRIS.

That system also provides, for the generation of control signals and billing data, defining the individual customer accounts and also a register for storing billing data. Australian Patent 577732 also discloses a mobile radio communication system which comprises a plurality of fixed stations respectively connected to a plurality of subscriber lines extending from a telephone exchange and a plurality of mobile stations linked with the fixed stations through radio channels. Each fixed station has means for transmitting rate charging information with rate collecting means being responsive to the rate charging information to vary its content.

Although each of the systems referred to have means for enabling access by a caller to the system and/or means for recording billing data, none are provided with a coin acceptance facility as a means of access control nor with a facility for enabling interphasing of peripherals such as fax machines and computers to the phone set.

SUMMARY OF THE INVENTION

It has not hitherto previously been known to provide a self contained cellular mobile radio phone of the type comprising a standard phone set, a radio transceiver and a handset and in addition to standard features also comprising in combination credit card reading means, a coin acceptance and rejection mechanism, an accessory interphase and a disposable cash box for enabling the ready recovery of coin from the cash box and without compromise to the security of the phone system.

It is envisaged that one application of the access control phone system would be in public vehicles such as taxis, buses, hire cars and the like whereby a passenger in such a vehicle may make a phone call whilst in transit by insertion of the requisite fee into a coin acceptor which forms one element of the overall system.

The system of the present invention comprises in broad terms an existing mobile radio phone having connected thereto an electronic coin acceptor module and a micro-controller/processor for controlling the activities of the coin acceptor and performing the general functions of tallying, timing of calls relative to an amount paid and allowing repeated use of the phone until the minimum coinage amount required for a call remains.

In one broad form the present invention comprises a mobile telephone system for use in vehicles having access control means for enabling access to and prevention of access to the mobile phone system; said access control means comprising: an infeed coinage acceptor module for use in receiving coins of a predesignated denomination and interconnected with a mobile radio phone unit, a micro-controller operably linked to said acceptor module and to a power supply in said vehicle; whereby, when coins of said predesignated denomination are inserted in said acceptor module, said microcontroller compares said infeed coinage with a predetermined amount programmed into said microprocessor thereby either allowing or disallowing operational access to said mobile phone.

In another form the invention comprises a mobile telephone system for use in vehicles having access control means for enabling access to and prevention of access to the mobile phone system; said access control means comprising: an infeed coinage acceptor module for use in receiving coins of a predesignated denomination and internconnected with a mobile radio phone unit, a micro-controller operably linked to said acceptor module and to a power supply in said vehicle; whereby, when coins of said predesignated denomination are inserted in said acceptor module, said microcontroller either allows or disallows access to said mobile phone according to coinage inserted in said coin acceptor.

According to the preferred embodiment of the invention the coin acceptor is linked to the cellular phone indirectly via an electronic controller having at least a display and memory facility.

A coin comparator according to conventional design is used in one embodiment.

According to an apparatus aspect of the present invention there is provided a telephone set comprising at least a telephone module, a coin infeed device and an electronic control means directly or indirectly linked to the mobile telephone.

In addition to the various embodiments of the coin acceptor mechanism, in the preferred embodiment, the mobile cellular phone is adapted with voice means to provide user instruction, a disposable cash box mechanism and an accessory interphase which allows the interphasing to the phone set of at least a facsimilie transmission machine and a computer.

In its broadest form the present invention comprises:

A self contained cellular vehicle mobile radio phone of the type comprising, a standard phone set, a radio trancseiver providing a means of communication between a mobile station and a fixed station, a handset having interface equipment including a keyboard microphone speaker and display means for displaying information relating to a phone call, means within the set for generating control signals and reading credit card data comprising at least a credit card reader with an associated administrative processor, memory for storing data read from the credit card, means to enable the phone to be operable from a vehicle's power supply, voice means to provide user instruction, characterised in that the phone also comprises, a coin acceptor mechanism having a single entry/exit slot and adapted with means to accept or reject coins, and/or a disposable cash box held within a cash box housing mechanism within the phone to facilitate ready removal of coins from the telephone, and/or an accessory iterphase to allow the connection of peripheral machines such as a facsimile machine and a computer terminal.

In the preferred embodiment, the coin acceptor mechanism has means for validating accepting or rejecting the coins.

The invention will now be described in more detail according to a preferred but non limiting embodiment of the invention and with reference to the accompanying illustrations, thereafter;

DETAILED DESCRIPTION OF THE PREFERRED EMBODIMENTS

Figure 1:
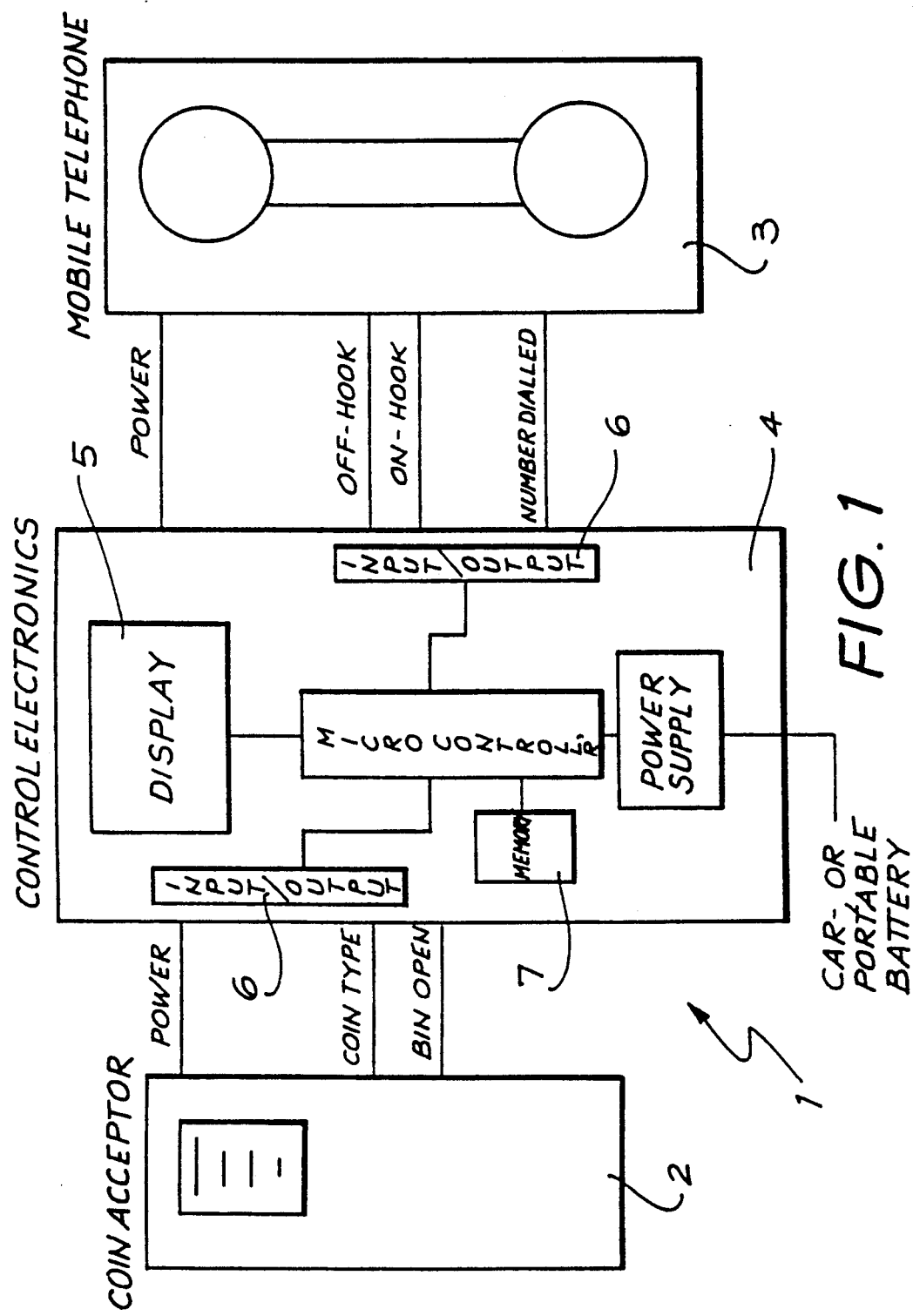
FIG. 1 shows a schematic layout of the mobile phone system with access control according to one embodiment of the invention.

Referring to FIG. 1 there is shows a schematic layout of a phone system 1 comprising generally a coin infeed device 2 a mobile telephone set 3 and a control module 4.

Coin infeed device 2 acts as an access control in conjunction with control module 4. In addition to the coin feed apparatus 2, the phone set is also adapted with credit card reading and information storage means enabling access to the system to be described below. In use an operator feeds coins of the requisite denomination, weight size, material or number into the infeed device 2. If the coins fed into the infeed device are commensurate with parameters pre-programmed into the microprocessor for the purpose of comparison, the coins will be accepted, with a signal contemporaneously being transmitted to the telephone handset 3 thereby enabling a call to be made on the phone. When the coins are passed they fall into a collection bin according to conventional means. Coins which are not accepted in accordance with the predetermined parameters in the micro processor will be allowed to exit the infeed device via a return chute for recovery by the operator. It is envisaged that coins of any selected denomination may be used and the microprocessor programmed in accordance with coin dictated selection criteria.

As an alternative to coin infeed access, the system is operable by means of bar coded or magnetic taped credit cards. In this instance the programming of the micro controller is varied within the coinage parameters and need not be held in the microprocessor memory. The reading of the card in this instance takes place according to conventional means such as a magnetic card reader.

The mobile telephone set 3 comprises a known mobile radio phone having conventional dialing apparatus. The phone has a modification to supply a signal for "off hook" status and also to accept "on hook" commands from the control module 4 so that calls may be terminated or to prevent phone usage depending upon coinage availability or card insertion.

The control module provides the intelligence for operation of the system. The module is operated either by a vehicle's battery or by an axially power unit located elsewhere in the vehicle The module according to a preferred embodiment also comprises a liquid crystal display 5.

The module is also equipped with input/output circuitry 6 and a memory 7. The module has a facility to perform at least the following functions:

(a) Tallying coin information and displaying both inserted total and remaining amount during the call.
(b) Controlling the mobile phone to allow calls and terminate usage when inserted coin amount is expended.
(c) Allowing multiple calls to be made per inserted figure (pending minimum amount remaining).
(d) Maintaining tally of operation statistics including
  (i) Number of calls made since system installed—cumulative.
  (ii) Time of calls made since system installed.
  (iii) Money inserted since installed.
  (iv) Calls made since coins last emptied.
  (v) Money inserted since coins last emptied
  (vi) Time of calls made since last emptied.
  (vii) Date/time phone set last emptied
  (viii) Other statistical information as required.
(e) Detecting of opening of coin collection bin and records as above.
(f) Retention of all statistical information in non-volatile memory which cannot be adjusted by the operator. Data is retrievable only by a specifically designed interrogation unit (separate module) with inbuilt access security.
(g) Audible/visual tamper/wilful damage alarm subsystem for protection of carrier and owners.
(h) A modem allowing direct remote access into transactional activities and statistical information for each unit for billing and administration purposes are included.

The three sections discussed above are then mounted into a rugged housing which can be permanently mounted in a vehicle in (a) a fixed position, or (b) provided with a swivel bracket allowing usage from several points within the car as well as providing a degree of security control (initially) over its usage (e.g. potentially risky personnel). A small portable case can also be used allowing the phone to be removed for servicing and/or replacement purposes.

Figure 2:
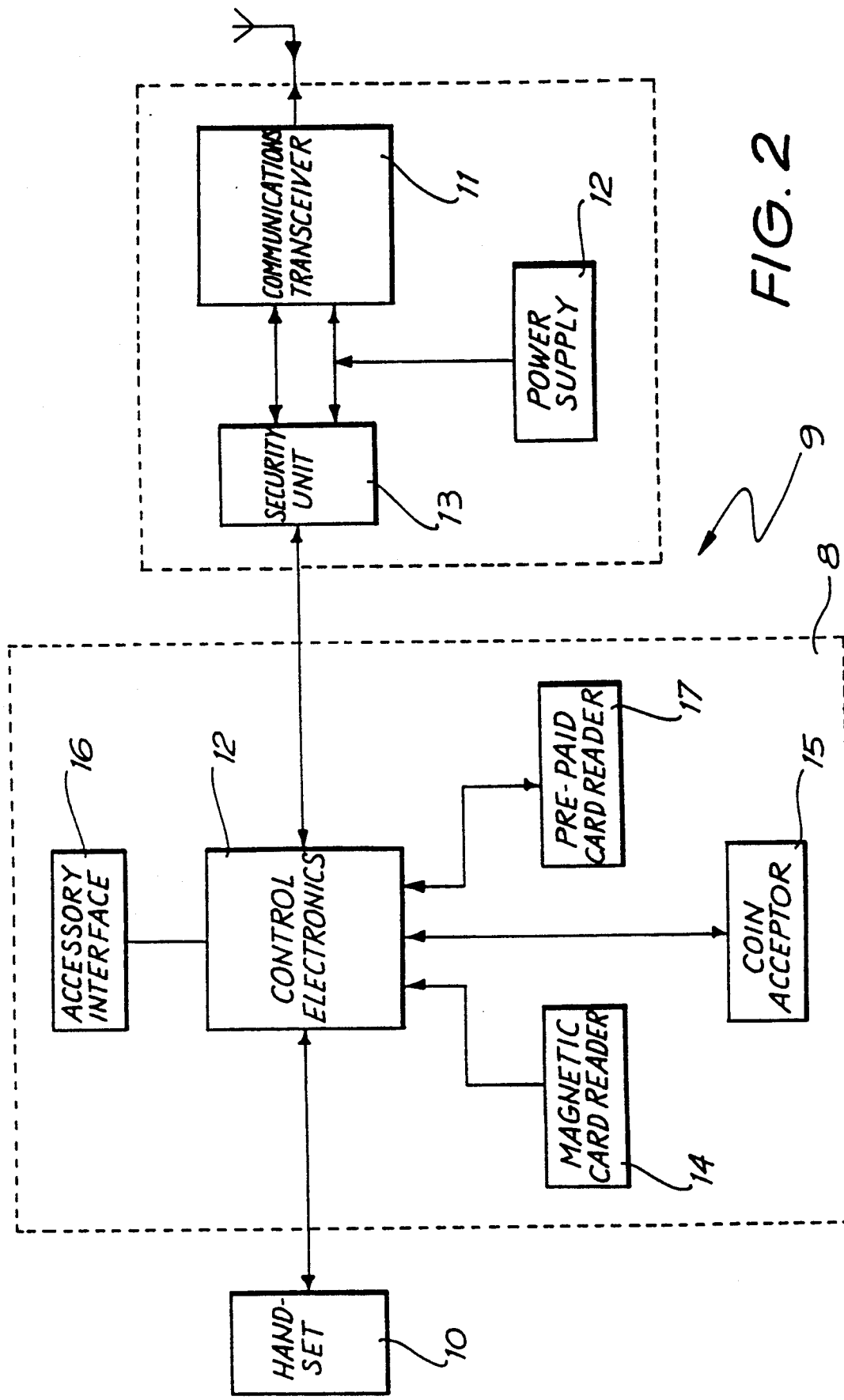
FIG. 2 shows a schematic layout of the system block diagram of the mobile telephone system.
Figure 3:
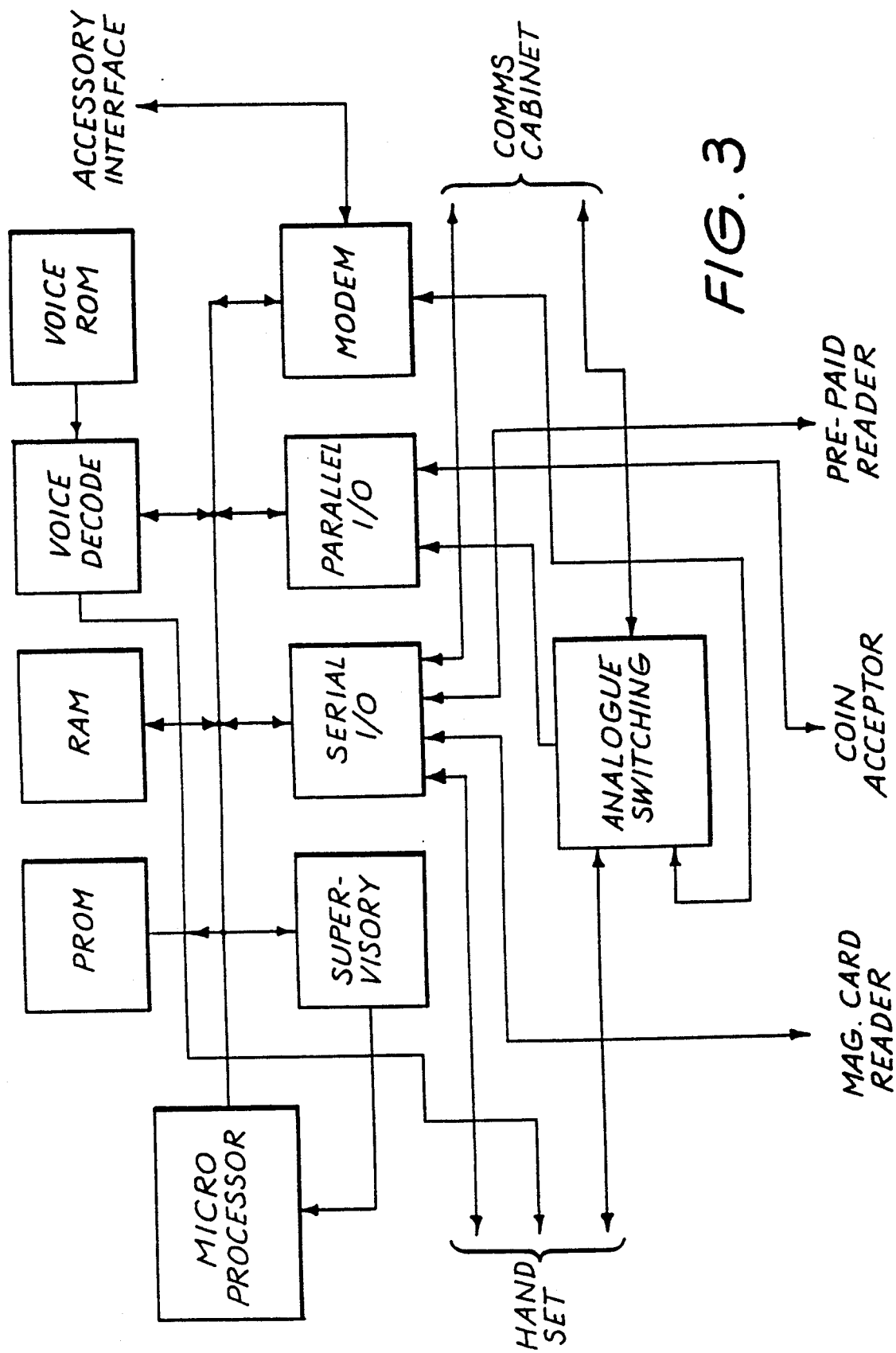
FIG. 3 shows a layout of the control electronics of the telephone system.
Figure 4:
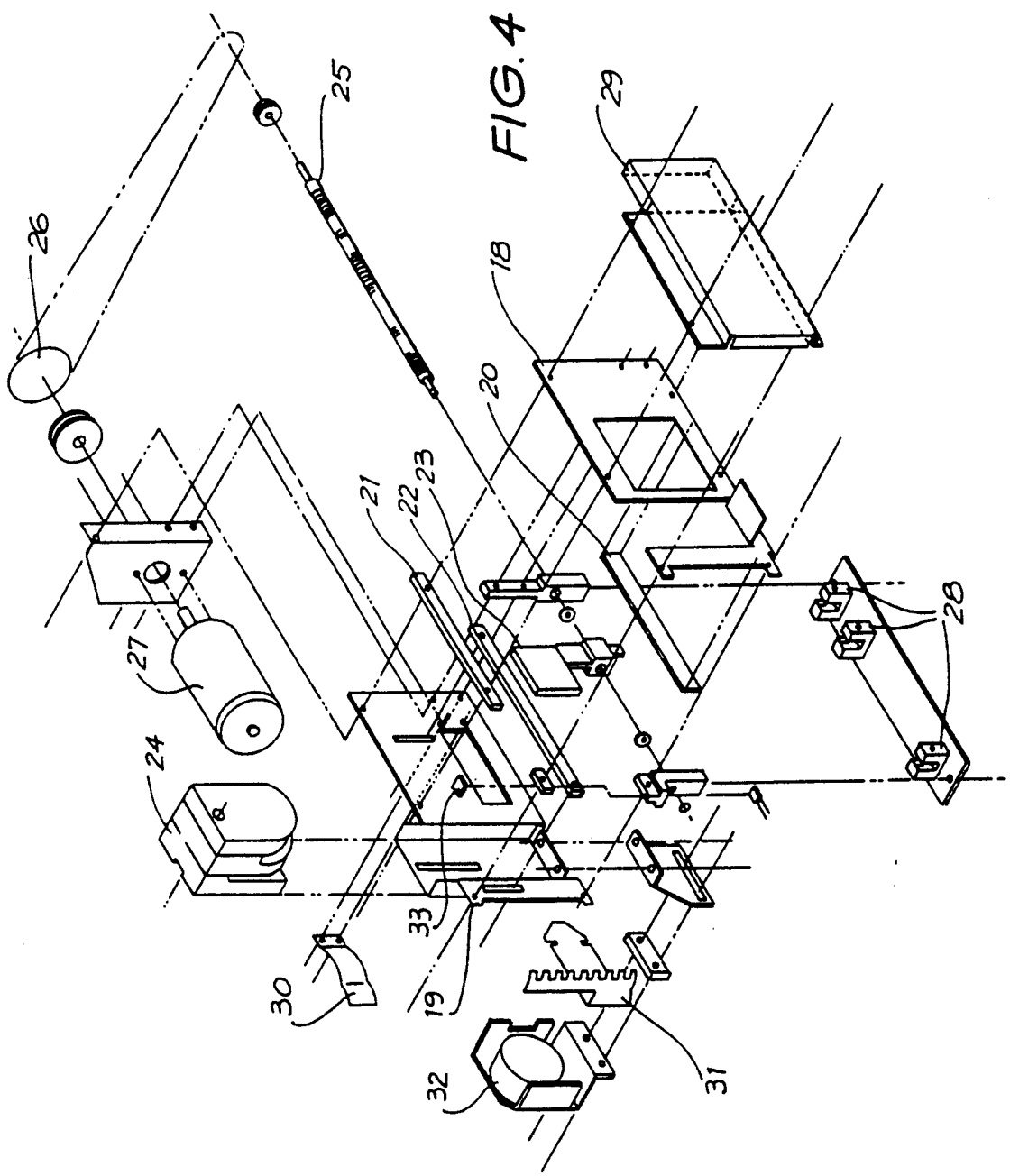
FIG. 4 shows an exploded view of the coin acceptor mechanism according to a preferred embodiment.

FIG. 2 shows a system block diagram of the pay telephone system essentially comprising a user interphase unit 8, a communications cabinet 9, in addition to an operator handset 10.

The cummunications transceiver 11 provides the means by which the phone set communicates with a land based network. The transceiver 11 is a standard component. The phone is powered via power supply means 12 which may be an 8 Volt to 32 VDC input version which allows the phone to be operated on 12 Volt or 24 Vdc fitted vehicles without manual adjustment or without manual adjustment or a 100V to 280 VAC version for vehicles fitted with AC supply.

A security unit 13 monitors signals from the control electronics 14 and shuts down the transceiver 11 if the phone is tampered with.

The control electronics 12 consists essentially of a microprocessor with a small communications monitor in a read only memory. The main payphone control programmes are loaded into non volatile random access memory at installation.

The handset 10 is interphased into the control electronics package 12 and it comprises standard user equipment such as a keyboard, display, earpiece, microphone and speaker.

The phone system also comprises a magnetic card reader 14 which is a known component adapted for reading data from standard magnetic cards.

Pre-paid card reader 17 is used to read and write prepaid debit cards. The unit is preferably motor driven and contains its own circuitry which is controlled by the mobile payphone.

The coin acceptor 15 and accessory interphase 16 have not previously been known in mobile phones and therefore constitutes an improvement in the known mobile telephone systems.

The major section of the coin mechanism has component parts which form a tubular passage down which the coin under test can freely fall. The said tubular passage is formed by the two chassis sections (18 & 19), the coin slide (20) and a spacer (21). An adjustable coin slide (22) is fitted inside the tube and can be adjusted parallel to the fixed coin slide to reduce the effective cross sectional area of the tube to suit various coin diameters. The adjustable slide (22) is fixed in position during the manufacturing process. The coin under test is inserted into the uppermost end of the tube and is allowed to fall freely under gravity.

A plastic foot (23) which fills the entire tube internal cross section, allowing sufficient clearance for movement, is used to bring the coin to a stop after is has passed through the comparator coil assembly (24). The spacer (21) is narrower than the coin slide (20) to produce a slot the full length of the tube which allows the foot material to pass outside and enclose a drive shaft (25) running parallel to the length of the tube. By rotating the thread either clockwise or anti-clockwise the foot 23 can be made to travel up or down the rectangular tube.

The thread is connected by an "O" ring belt (26) to a DC motor (27). The motor is controlled by the microprocessor in the mobile payphone to achieve the coin mechanism functions to be described below. The foot 23 has a thin section of material on the opposite side of the thread to the coin chute which is used to pass through three electronic photo-interrupters (28) mounted at spaced intervals parallel to the thread. These interrupters are used to sense "idle", "accept" and "reject" positions of the foot 23. The photo-interrupters are also monitored by the microprocessor controller.

Attached to an opening in the bottom of one side wall of the mechanism is coin accept chute (29) used to guide the accepted coin to the cash box. The accept chute is of fixed cross sectional area and runs parallel to the main tube but offset to one side by the tube's width. When the foot 23 is lowered to the "accept" position, the coin is pushed through the side of the main tube toward the accept chute by the accept spring (30). The spring is pushed back when the foot 23 returns upward to its idle position.

The coin mechanism also has a solenoid gate (31), controlled by the solenoid (32), which can be closed across the coin entry slot to prevent entry of coins or other matter. The gate 31 has a comb-like pattern on its leading edge to prevent removal of inserted coins which attached pieces of thread. An infrared transmitter (33) and receiver (34) are mounted opposite each other in the shortest sides of the uppermost edge of the tube. The light beam produced is broken by either an object entering the tube or the gate when in its closed position.

The timing and control functions for the coin mechanism tegrated into the mobile payphone microprocessor circuit. These functions could just as easily be performed by a small single-chip processor in a stand-alone application. The three main positions of the coin foot are shown at the bottom of the coin mechanism exploded diagram.

In the unattended state, the entry gate 31 is closed preventing insertion of either coins or foreign items such as sticks, matches, etc. into the mechanism. When prompted by a user action, in this case lifting the phone handset, the gate 31 is opened. A coin can then be inserted into the entry/exit slot and falls via gravity through the front light beam from infrared transmitter 33 through the coin comparator/validator 24 coils and comes to rest on the foot 23, which is in its "IDLE" position.

The electronics senses, via a break in the light beam, that an object has been inserted and waits for a signal from the validation circuitry to indicate that the coin is valid. If no signal is detected after a pre-set time, the object is rejected by driving the foot to the top of the chute ("reject" position) pushing the object out of the entry slot. The foot 23 then returns to its rest position and the entry slot light beam is checked for continuity. If the beam is still broken, several more attempts to reject the object are made and if still unsuccessful, an error is issued.

If a valid coin signal is detected, the gate is closed and the coin is retained in an escrow position by the foot 23. The user is then allowed to dial a number to place a call. If the handset is replaced, or the "END" key pressed, the call is assumed to be unsuccessful and-the coin is returned in an identical manner to the foreign object as described above.

Figure 5:
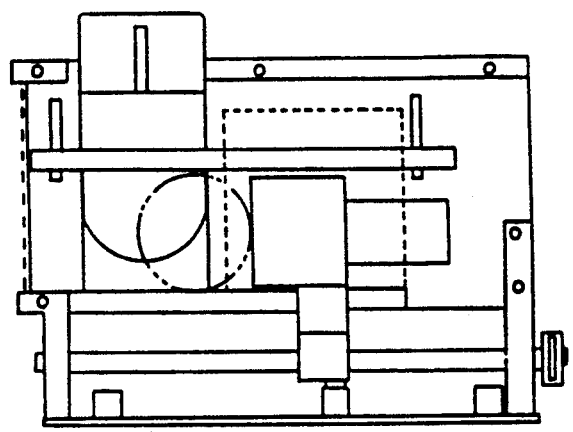
FIG. 5 shows an assembled elevational view of the coin acceptor mechanism with the foot in the idle position.
Figure 6:
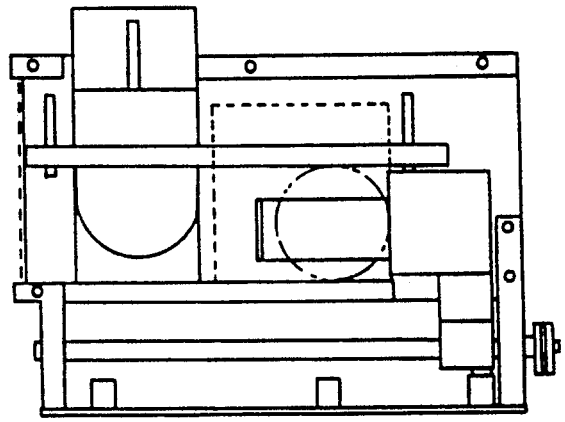
FIG. 6 shows an assembled elevational view of the coin acceptor mechanism with the foot in the accept position.
Figure 7:
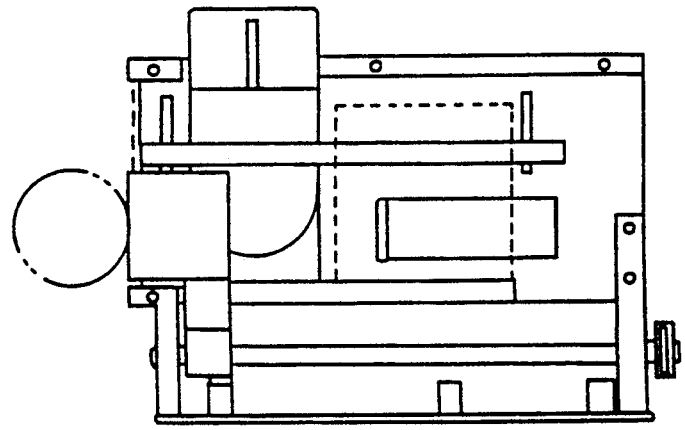
FIG. 7 shows an assembled elevational view of the coin acceptor mechanism with the foot in the reject position.

If the call is deemed to be successful, the foot 23 is driven downward to its "ACCEPT" position and the coin is forced into the accept chute where it falls via gravity into the cash box. After acceptance the foot is returned to its "IDLE" position and the gate 31 is opened allowing another coin to be inserted. FIGS. 5, 6 and 7 show the assembled views of the coin mechanism wherein the foot 23 is shown in the idle, accept and reject modes as described above.

Figure 8:
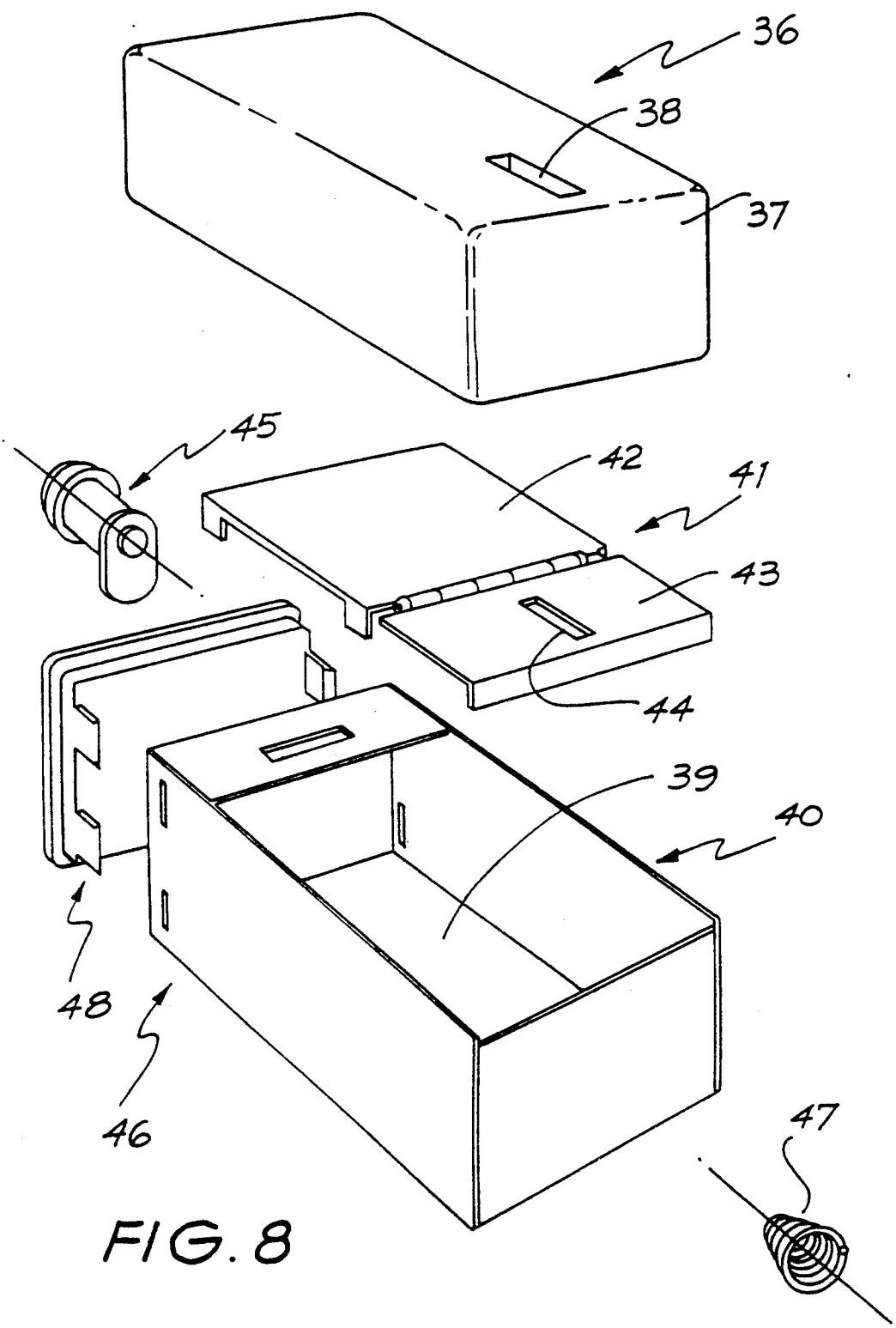
FIG. 8 shows an exploded view of the cash box assembly with disposable cash box according to a preferred embodiment.
Figure 9:
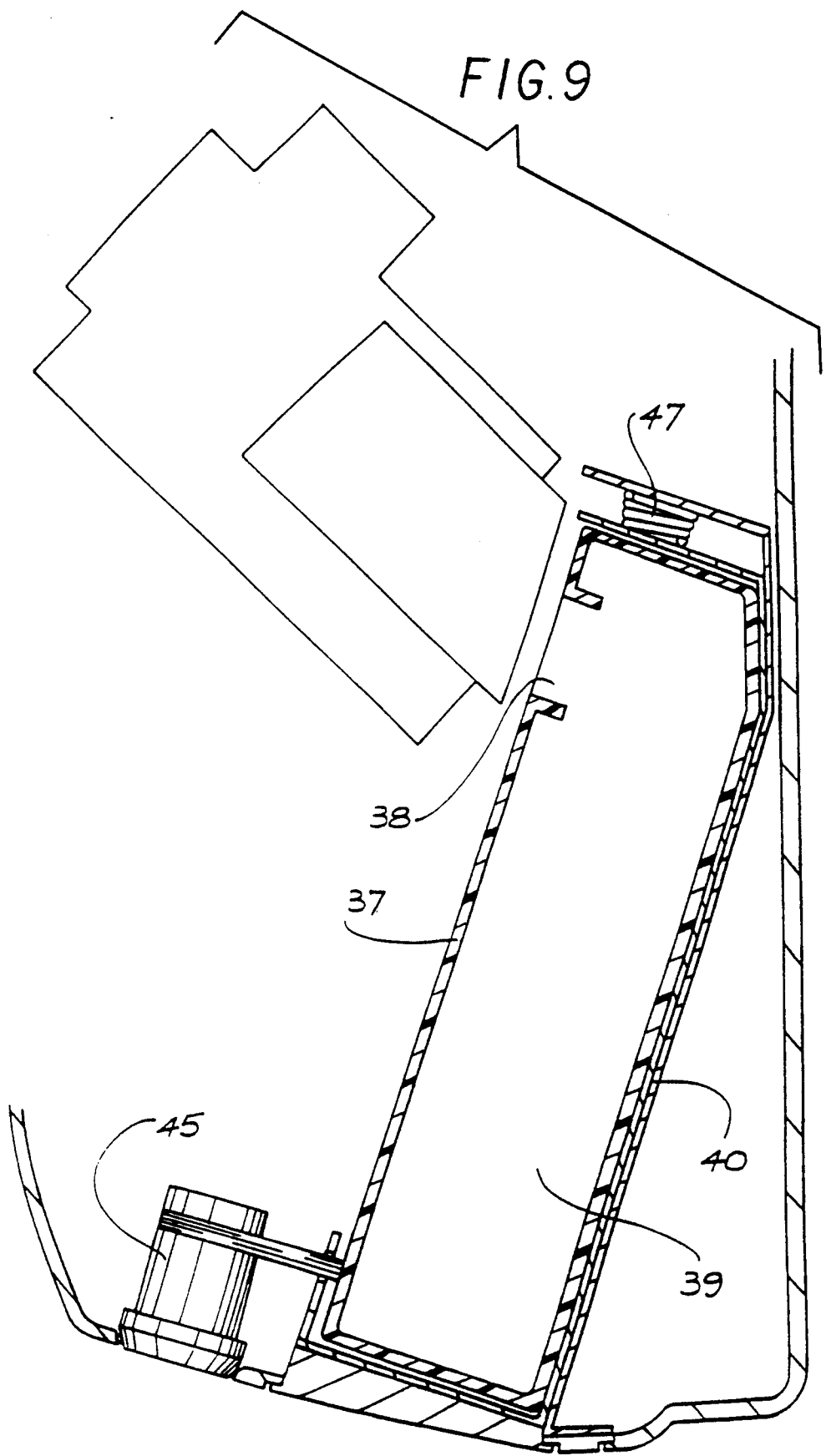
FIG. 9 shows a side elevational view of the cash box assembly.

The mobile phone of the present invention is also adapted with a disposable cash box as shown in FIGS. 8 and 9. The mobile phone is intended for use in applications where the cash box can be emptied by specified personnel associated with the vehicle in which the phone is located. However, due to the small size of the device there is insufficient space to include a securely locked "cash safe" as is used in many public phones. A solution to this problem has been found by using a disposable cash box assembly 36, which is held in the phone in a metal tray. The cash box assembly is shown in an exploded view in FIG. 8. The cash box assembly 36 comprises a disposable box 37 which has a slot 38 and which is adapted to fit inside a recess 39 in the metal tray 40. The cash box 37 is moulded from a robust synthetic material which prevents it from being broken open by an accident such as being dropped on a concrete floor when full of coins. Coins can enter the box via the slotted opening 38 in the top surface, which is aligned with the coin accept chute of the coin mechanism previously described. A system of flaps (not shown) on the inside of the slot 38 prevents coins from being removed without visibly damaging the moulding.

The use of the disposable cash box 37 allows phones to be cleared of cash quickly by simply removing the old cash box and replacing it with a new empty unit. The used box can then be returned to a security room where it is split open and its contents counted. The emptied box can then be crushed and stored in a low volume format for return to the manufacturer for recycling.

The metal tray 40 is adapted with a lid 41 which is formed by pivotally attached plates 42 and 43. Plate 43 has a slot 44, which when in position, aligns with slot 38 to enable coins to enter the cash box 37. Associated with the tray is a facia plate 45 which engages end 46 of the tray 40. The tray is also adapted with a lock 48 which secures the cash box assembly.

The tray 40 when in position is pushed against a spring bias 47 to enable ejection of the tray 40 when the facia plate 45 is removed.

Opening of the cash tray is achieved by the use of both a security key and magnetic card. The phone already has a magnetic stripe card reader fitted for credit card transactions. Prior to turning the security key in the lock 45 to remove the cash tray, a specially encoded magnetic card must be swiped. If the card data match the data pre-programmed in the phone, removal of the tray is unhindered. If no card is inserted or the data does not match, the phone will sound a piezoelectric siren as well as totally disable any further user calls. The phone will also attempt to call the management center to notify it of the violation.

The combination of both card and key reduces the potential of fraud by copying the key. By preventing further operation of the phone the possibility of regular undetected cash box removal is also minimised.

FIG. 9 shows a side elevation view of the disposable cash box mechanism.

The phone is also adapted with an accessory interphase to allow connection peripherals such as facsimile and computer machines. The accessory interphase is facilitated by a single multi-pole connector situated on the front panel of the mobile payphone. The phone microprocessor determines the type of equipment connected to the line by means of a combination of sensing on the signal lines and special "function select" pins.

To allow a portable facsimile machine to be used with the phone a cable must be purchased with appropriate signals connected in a format specific for direct connection to a given brand of machine, or a universal acoustic coupler can be used. When the type of cable is sensed the phone will allow a normal call sequence to commence. When "B party answer" is detected the facsimile is automatically connected to the audio in/out lines of the radio communications subsystem. Controls on some facsimile machines may need to be operated to allow transmission or reception to occur.

The connector also has pins to emulate an RS232 Modem unit. The software within the phone will emulate standard modem protocols allowing the user to connect a portable computer such as a laptop to the phone and use standard communications software on the computer to send and/or receive data.

The phone detects dialing commands from the computer and will open the coin mechanism door and accept payment as soon as these commands are received, whether or not the handset has been lifted. This facility prevents the user attempting to hold his computer, a handset and coins simultaneously.

The phone also includes software to communicate with an EFTPOS type PIN pad device via a RS232 serial port. Such a device can have a secured PIN pad, display and receipt printer all powered from the mobile payphone connector. The phone detects presence of the PIN pad device and, when a credit card is passed through the phones magnetic card reader, prompt the user to "Lift the PIN pad and follow the instructions. On completion of the sequence the phone will then prompt to "Please dial number".

So that the mobile payphone can be relatively language independent digitized human speech is used for user instructions where needed. If the user lifts the handset to place a call and proceeds to select functions in the correct manner no instructions will be given. If no buttons are pressed after a short time delay, or an incorrect sequence is attempted the user will be given audible instructions from a separate speaker integrated into the handset. Instructions are issued from the point in the sequence that the phone is currently placed. For example, if the user has dialed a number and is waiting for connection, as with a standard public switched network telephone, the phone will respond after a pre-set time interval with "Press "SEND" to start call or "CLEAR" to correct the dialed number".

Instructions are issued in the default language initially. The handset contains buttons labelled with national flags of the major country in which the languages available are used. The user, on hearing instructions in other than his native tongue, can press the appropriate key to change languages.

In order to maintain language independence the phone facia uses only pictograms to represent key or light functions.

All voice messages are digitized from studio produced tapes using readily available encoding equipment. The resulting digital codes are then transferred into non-volatile memory installed in the phone. The mobile payphone's control processor then retrieves information which is then sent to a voice decoding device which after filtering and amplification is directed to the appropriate loudspeaker. All equipment used is commonly known and available.

The phone contains a third party vendors single chip modem which can access other data terminal equipment via its communication channel. The modem is supported by software that allows standard CCITT protocols to be used in addition to error detection algorithms. The ability to transfer digital data via its communication channel allows the phone to achieve the following:

Automatic setting up of the phone on installation.

When a new mobile payphone is installed and turned on. The installation technician swipes an "engineering installation" card which forces the phone to start an installation procedure. The phone then places a call to its management center which consists of a computer facility with custom software and modem communications. The technician must enter a predetermined identification number of that site which is checked against new installation records in the center. The phone also communicates with custom software in its transceiver to determine the telephone number of the installation. This procedure is required as the transceivers are standard and phone numbers are not allocated until the unit is pre-commissioned prior to delivery. The telephone number is also sent to the management center so that the center can in dial when required.

Once the installation's identification and telephone number are verified the center checks with its records for that site and proceeds to download operating software for the phone. This procedure is achieved using the internal voice band modem. Data is assembled into relatively small blocks and re-transmission on error detection is used. Forward error correction is also achievable if required in some transmission media.

Along with the operation software the operating configurations of the phone is recorded in the form of a block of configuration data. This data can be individual to every phone in the system if required.

A final and functional test is performed when all data loading is completed. If no errors are detected the center is notified and the mobile payphone becomes operative immediately. If errors are present the installation technician is informed by an error message and has the option of making a retry or performing diagnostics.

Cost effective software modifications/upgrades.

The mobile payphone has only minimal software for communications resident in Read Only Memory. All operational software is downloaded from the management center into non-volatile Random Access Memory within the mobile payphone controller system. Then by dialing into each payphone in-turn the center can send a "clear" command which will cause the permanent ROM based communications software to take control of the phone. New operational software can then be downloaded to the phone as in the installation procedure above.

The ability to completely replace software means that modifications or upgrades can be remotely and automatically performed without the need for costly and slow site visits. Site visits are particularly difficult where the phone is mounted in an almost constantly mobile vehicle.

As in the example above the central download facility can also be used to remotely change such data as tariffs for customer calls and telephone configurations such as allowing international calls, incoming calls, etc. The phone can also be disabled totally in cases where the mobile phone owner/subscriber is collecting cash and has not returned payment within specified accounting periods. Phone operation can be remotely re-enabled when payment has been received.

Call control is achieved by using digit analysis of the number called. Incoming calls can be disabled by preventing lifting of the handset from answering an incoming call Facilities such as this can be achieved because of the control available from the interface unit which is situated between the transceiver and handset. The interface unit software receives commands coming to/from the transceiver from/to the handset. Only those commands permitted at that particular stage of the call are passed through. Command translation can also be performed, e.g. pressed CLEAR on the handset while a call is progressing actually sends the END command to the transceiver to terminate the call.

Remote collection of accumulated statistics.

The phone automatically collects a wide range of statistics for revenue collection, marketing and, engineering purposes such as cash box levels, credit card transactions, call statistics, communications network congestions levels, etc. This data is automatically transmitted to the management center on a regular basis, e.g. daily. The regular transmission of data also acts as a barrier against fraud in that software within the phone will totally disable customer use of the phone if communications with the management center cannot be established within a certain period, e.g. 3 days. Use of a specially programmed "engineering" magnetic stripe card is required before the phone can be re-enabled.

When the mobile payphone is used on a cellular communications network calls can be lost due to low signal strength. The cellular network will usually maintain a channel open for a short period of time after signal is lost but will terminate the call if communications are not re-established after that time. The mobile payphone is intended to behave as closely as possible to a standard public phone to simplify use by the general public.

To reduce the difficulty experienced by users, where calls are lost due to a weak signal, the mobile payphone monitors call progression via transceiver control signals. If the network terminates a call the phone will give a verbal message to the user to inform him that the call has been terminated and the phone will automatically re-dial the last number as soon as signal strength increases to a satisfactory level. When adequate signal level is detected the phone will inform the user that "your call will now be re-dialed" and proceeds to re-establish the lost connection.

Automatic re-dialing will only occur if there is sufficient user credit remaining in the phone.

In use, the phone operator feeds coins (in the case of the coin in feed option) into the coin in feed device 2. An apparatus within the in feed device which receives the coinage is lined to the microprocessor and the coins are either accepted and recorded or exited from the device according to the correlation between the coinage parameters and the programmed parameters. In one embodiment the coins may be released into the coin receiving bin by means of a relay signal from the controller to the solenoid with the controller then reading and recording either digitally or by other means the number of coins inserted. Tallying of calls may be done with electronic counters so to the tallying and timing of calls.

Where weighing of coins is preferred according to an alternative embodiment the weighing takes place utilising a weighing transducer linked to both a coin weighing hopper and/or the controlling module 4.

It will be recognised by persons skilled in the art that numerous variations and modifications may be made to the invention as broadly described herein and with reference to the accompanying illustrations.

I claim:

1. A self contained cellular mobile radio phone of the type comprising:
   a standard phone set;
   a radio transceiver providing a means of communication between a mobile station and a fixed station;
   a handset having interface equipment including a keyboard microphone speaker and display means for displaying information relating to a phone call;
   means within the set for generating control signals and reading credit card data comprising at least a credit card reader with an associated administrative processor;
   memory for storing data read from the credit card;
   means to enable the phone to be operable from a vehicle's power supply;
   voice means to provide user instruction;
   characterised in that the phone also comprises in combination:
   a coin acceptor mechanism having an entry/exit slot and adapted with means to accept or reject coinage;
   a cash box housing mechanism including a removable box therein, said box having an opening to allow coin access therein whereby said opening aligns with an accept chute;
   said housing including a tray having a removable lid provided with an opening in said box thereby enabling coin access to said box when said box is in said tray; and
   an accessory interface to allow the connection and operation of peripheral machines such as a facsimile machine and a computer terminal.

2. A mobile phone according to claim 1 wherein the coin acceptor mechanism comprises:
   a comparator coin assembly, through which a coin passes,
   a coin entry chute,
   a fixed coin slide, and
   an adjustable coin slide within said chute, said adjustable coin slide being adjustable parallel to the fixed coin slide in order to reduce the effective cross sectional area of the chute to suit various coin diameters wherein said cash box is disposable.

3. A mobile phone according to claim 2 wherein the coin acceptor mechanism also comprises a movable foot which approximates the size of the cross section of the said chute and which is adapted to prevent the passage of a coin inserted therein.

4. A mobile phone according to claim 3 wherein the said movable foot is mounted on a drive shaft which is in turn interconnected with a drive motor which actuates the movable foot.

5. A mobile phone according to claim 4 wherein the foot is adjustable up or down the length of the chute.

6. A mobile phone according to claim 5 wherein the said motor is controlled by a microprocessor in said phone set thereby facilitating operation of the coin acceptor mechanism.

7. A mobile phone according to claim 1 wherein when a coin is in said slot and when the handset is replaced onto the set without a phone call being made the coin exits from the machine.

8. A mobile phone according to claim 1 wherein the housing has associated therewith a locking plate which in association with a lock secures the housing inside a saddle in the phone set.

9. A mobile phone according to claim 8 whereby the housing is urged against a spring located in the saddle so that when the housing is urged into the saddle and when the locking plate is removed the spring bias causes the housing to fully or partially exit the machine.

10. A mobile phone according to claim 9 wherein, when the housing is to be removed, a security card is first passed through the card reader thereby allowing key actuation of said lock.

11. A mobile phone according to claim 10 wherein the phone set has a piezolectric siren which disables the phone set wherein information on the security card does not match with information stored in a microprocessor in said phone set.

12. A mobile phone according to claim 1 wherein the accessory interface on the phone set has attached thereto means to enable insertion into a memory in said phone set data from a numerical counter located within the vehicle.

13. A self contained cellular mobile radio phone of the type comprising:
   a standard phone set;
   a radio transceiver providing a means of communication between a mobile station and a fixed station;
   a handset having interface equipment including a keyboard microphone speaker and display means for displaying information relating to a phone call;
   means within the set for generating control signals and reading credit card data comprising at least a credit card reader with an associated administrative processor;
   memory for storing data read from the credit card;
   means to enable the phone to be operable from a vehicle's power supply;
   voice means to provide user instruction;
   a coin acceptor mechanism having an entry/exit slot and adapted with means to accept or reject coinage;
   a cash box held within a cash box housing mechanism within the phone to facilitate ready removal of coins from the telephone, and an accessory interface to allow the connection and operation of peripheral machines such as a facsimile machine and a computer terminal;
   wherein the coin acceptor mechanism comprises:
   a comparator coin assembly through which a coin passes;
   a coin entry chute;
   a fixed coin slide;
   an adjustable coin slide within said chute, said adjustable coin slide being adjustable parallel to the fixed coin slide in order to reduce the effective cross-sectional area of the chute to suit various coin diameters;
   a movable foot which approximates the size of the cross section of said chute and which is adapted to prevent the passage of a coin inserted therein; and a drive motor having a drive shaft which said movable foot is attached so as to adjust the foot up or down the length of the chute;

wherein the motor is controlled by a microprocessor and the foot has means to engage with or pass across or through an idle, accept or reject spaced apart photo interrupters, said photo interrupters being controlled by said microprocessor in response to validation of coin by said coin comparator.

14. A mobile phone according to claim 13, wherein, when a coin is accepted via said coin comparator the coin passes via a coin accept chute into a cash box.

15. A mobile phone according to claim 13 wherein the said accept chute is of fixed cross section and runs parallel to the main chute but is offset to one side of the main tube by a distance approximating the tubes width.

16. A mobile phone according to claim 15 wherein, when the foot is lowered to the accept position, the coin is pushed through the side of the entry chute to the accept chute by means of an accept spring.

17. A mobile phone according to claim 16 wherein said spring retracts when said foot returns to the idle position.

18. A mobile phone according to claim 17 also comprising in the coin acceptor mechanism, a solenoid adapted to facilitate closure across an entry slot to the chute to prevent entry of coins or foreign bodies.

19. A mobile phone according to claim 18 wherein closure across the entry slot is effected by means of an infrared transmitter and receiver which are mounted opposite each other wherein a light beam which is produced from said transmitter is broken by an object entering the entry chute thereby placing a solenoid gate connected to the solenoid in a closed position.

20. A mobile phone according to claim 19 wherein when the handset is lifted from the phone set the solenoid gate is moved to the open position.

21. A mobile phone according to claim 20 wherein when a coin is inserted into the entry slot via the coin validator the foot is in engagement with the idle photo interrupter.

22. A mobile phone according to claim 21 wherein when a coin has been inserted into the comparator for validation of said coin, if a signal emits from the comparator the solenoid gate closes thereby retaining said coin.

23. A mobile phone according to claim 21 wherein when a coin has been inserted into the comparator for validation of said coin if a single does not emit from the comparator the solenoid gate remains open said coin thence being driven from said slot when the foot is urged into the reject position.

24. A mobile phone according to either claim 1 or 13 wherein the accessory interface comprises a multi-pole connector located on a panel on the phone set.

25. A mobile phone according to claim 24 wherein a microprocessor in the phone set provides means for sensing accessory identifying signals on a signal line in combination with function select pins linked to accessories.

26. A mobile phone according to claim 25 wherein when a facsimile machine is to be interfaced into the phone set a cable with predesignated signal format capability is connected to the phone set.

27. A mobile phone according to claim 25 wherein wherein when a facsimile machine is to be interfaced into the phone set an acoustic coupler is used.

28. A mobile phone according to claim 27 wherein when said microprocessor senses the signal format of said cable the phone set enables a call sequence to commence.

* * * * *